United States Patent
Wang et al.

(10) Patent No.: US 7,755,513 B2
(45) Date of Patent: Jul. 13, 2010

(54) VISUAL NAVIGATIONAL AIDS BASED ON HIGH INTENSITY LEDS

(75) Inventors: Sean Xiaolu Wang, Wilmingtown, DE (US); Rongsheng Tian, Newark, DE (US)

(73) Assignee: BWT Property, Inc., Newark, DE (US)

( * ) Notice: Subject to any disclaimer, the term of this patent is extended or adjusted under 35 U.S.C. 154(b) by 67 days.

(21) Appl. No.: 11/622,234

(22) Filed: Jan. 11, 2007

(65) Prior Publication Data
US 2008/0007430 A1    Jan. 10, 2008

Related U.S. Application Data

(60) Provisional application No. 60/766,371, filed on Jan. 13, 2006.

(51) Int. Cl.
G08G 5/00    (2006.01)
(52) U.S. Cl. .................. 340/955; 340/953; 340/954

(58) Field of Classification Search .......... 340/947–956
See application file for complete search history.

(56) References Cited

U.S. PATENT DOCUMENTS

| | | | | |
|---|---|---|---|---|
| 2,332,383 | A * | 10/1943 | Kost | 340/950 |
| 4,170,767 | A * | 10/1979 | Tanner | 340/955 |
| 5,982,299 | A * | 11/1999 | Shemwell | 340/953 |
| 6,509,844 | B1 * | 1/2003 | Eyring | 340/954 |
| 6,753,762 | B1 * | 6/2004 | Jorba Gonzalez | 340/333 |
| 7,357,530 | B2 * | 4/2008 | Wang et al. | 362/249 |

* cited by examiner

Primary Examiner—Brent Swarthout
(74) Attorney, Agent, or Firm—Frank F. Tian

(57) ABSTRACT

A visual navigational aid for guiding the approach path of incoming aircrafts, ships or other vehicles. The visual navigational aid comprises high intensity light emitting diodes (LEDs) or LED arrays and optical beam shaping apparatus that produce multiple light beams with different colors or flash patterns to guide the incoming aircrafts, ships or other vehicles to a pre-determined approach path.

24 Claims, 4 Drawing Sheets

VISUAL NAVIGATIONAL AIDS BASED ON HIGH INTENSITY LEDS

REFERENCE TO RELATED APPLICATIONS

This application claims an invention which was disclosed in Provisional Patent Application No. 60/766,371, filed Jan. 13, 2006, entitled "Visual Navigational Aids Based on High Intensity LEDs". The benefit under 35 USC §119(e) of the above mentioned United States Provisional Applications is hereby claimed, and the aforementioned application is hereby incorporated herein by reference.

FIELD OF THE INVENTION

This invention generally relates to visual navigational aids, and more specifically to precision approach path indicators (PAPIs) based on high intensity LEDs.

BACKGROUND

A visual approach slope indicator (VASI) or a precision approach path indicator (PAPI) relies on the color variation of a multi-beam light source to guide a vehicle such as an aircraft to the correct glide slope. Incandescent, fluorescent or arc lamp based light sources have been employed in the previous disclosed VASI or PAPI apparatus. Some examples can be found in U.S. Pat. Nos. 4,034,480, 4,064,424, 4,183,078, 4,430,695, and 4,532,512.

In U.S. Pat. No. 4,034,480 to Mehrtens, entitled "VISUAL DESCENT SIGHTING DEVICE FOR AIRCRAFT", a self-contained sighting device for use in aircraft that will give visual descent guidance to the pilot while making his final approach to a runway for a landing is described. The device comprises frames or windows that sight along an imaginary approach path which automatically directs the pilot's line of sight to parallel the desired approach path thereby aiding the pilot in his approach to the intended landing spot.

U.S. Pat. No. 4,064,424 to Hergenrother, describes a visual glide path beacon system. The beacons are placed in pairs at opposite ends of a runway so that it becomes possible to dispense with the conventional runway lights presently used to delineate the runway. In order to fill in the dark zone which surrounds the convergence produced when a lens is used to intensify the brightness of the colored zones, the invention uses an apertured mirror positioned opposite the lens. This permits the pilot to see the beacons through all parts of a traffic pattern as well as in the intensified colored zone guidance region. Instead of using a single light source projecting through a color filter to form the color zones, this invention uses two light sources such as incandescent lamps which project the color zones in slightly different directions which differ, by say, an angle of one degree. The two lamps are flashed on and off alternately producing a "scanning" action of the colored zone pattern.

U.S. Pat. No. 4,183,078 to Kidd, describes an approach slope indicator unit for use at the edge of airfield runways which produces a split beam of light, the interface of which may be adjusted to the required angle of flight path to guide incoming aircraft, the indicator unit comprising a support assembly having mounted therein at least two projection tubes, each projection tube housing a removable pre-aligned projector having a light source, a red-passing filter and a divergent lens disposed to produce the split beam of light.

U.S. Pat. No. 4,430,695 to Payne et al. describes a visual landing aid for aligning an aircraft landing aid projector of the type which comprises a light source located at the focus of a parabolic reflector, a lens mounted coaxially with the parabolic reflector and a filter disposed intermediate the reflector and lens close to the focal point of the lens. The apparatus comprises a base having a surface portion for supporting a projector, a lens for focusing light from the projector onto an image receiving means and means allowing observation of the image receiving means. The filter of a projector is correctly positioned when it appears in focus on the image receiving means.

U.S. Pat. No. 4,532,512 to Tanner describes an omnidirectional approach slope indicator unit for heliports. The unit may include two oppositely directed light beam generators secured to a rotatable shaft, the light beam generators generating light beams of differing colors to alert an approaching aircraft of his position relative to the glide slope indicated by the light beams.

The lamp based VASI or PAPI apparatus including the ones listed above suffer from a short life span of less than 2,000 hours (<2,000 hours). To solve this problem, laser based VASI or PAPI apparatus have been disclosed in U.S. Pat. No. 5,287,104 to Shemwell, which describes method and apparatus for aiding a landing aircraft. Three differently-colored beams of laser light are produced and transmitted, one of the beams of laser light being transmitted in a plane containing the direction from which the aircraft is approaching. Another of the beams of light is transmitted on one side of the plane, and the third of the beams of light is transmitted on the other side of the plane. The pilot of the aircraft can determine whether the aircraft is on the plane or to the one side or the other by the color of the light the pilot receives. If desired, at least one of the colored laser beams that is transmitted toward one side of the plane can be broken into a plurality of adjacent fan-shaped beams, the light in at least one of the fan-shaped beams being interrupted intermittently. However, the laser based VASI or PAPI apparatus typically suffer from high cost and low luminous power, or in other words, low luminous flux.

Therefore a need exists for an improved VASI or PAPI apparatus which offers a combination of long life time, low cost, and high luminous power.

SUMMARY OF THE INVENTION

This invention discloses a new type of PAPI or VASI apparatus, which utilizes recently developed high intensity light emitting diodes (LEDs) or LED arrays as its light source. LEDs have advantages over prior art lamps or illumination devices. The advantages include the production of more light per Watt than do incandescent bulbs. Further, LEDs can emit light of an intended color without the use of color filters, thereby being more efficient including lowered initial cost. In addition, unlike incandescent lamps which turn yellow when used in applications where dimming is required, LEDs do not change their color tint as a current passing through them is lowered in value. Typically, LEDs are built inside solid cases that protect them, unlike incandescent and discharge sources, making them extremely durable. LEDs have long life span when operating at their rated power: typically in the upwards of 100,000 hours, which are twice as long as the best fluorescent bulbs and twenty times longer than the best incandescent bulbs. Other advantages include lighting up very quickly which is suitable for use as communications devices. In addition, LED light sources can provide a high luminous power and luminous intensity that meet requirements such as those of FAA, ICAO, UK-CAA, NATO as well as other international organizational standards regarding approach lighting for vehicles including aircraft, etc.

The present invention provides a novel optical system to control the beam shape of the LED light in such a way that the transition region between different colors (or different flash patterns) of the LED beam is narrowed down to a small spread angle for high precision approach path indication.

It is another goal of the current invention to provide multiple sensor elements for controlling the performance of the PAPI apparatus. Such sensor elements include inclination sensors to measure the elevation angle of the LED beam, temperature sensors to measure ambient temperature, and photo detectors to measure LED intensity and ambient light conditions. The information collected by the sensor elements is sent to a micro-controller, which can adjust the LED intensity according to the operation conditions of the PAPI.

The present invention discloses a PAPI apparatus that can be either manually controlled or remotely controlled through a wireless transceiver.

A visual navigational aid for guiding a vehicle to a pre-determined approach path is provided. The visual navigational aid comprises a plurality of high intensity LEDs or LED arrays to produce multiple light beams with different colors and/or flash patterns; and a plurality of optical beam shaping apparatus to control the shape of the light beams in a way such that different colored and/or patterned light beams are separated in a layered structure by narrow transition zones, and the color and/or flash pattern variation of the light beams is used for guiding the vehicle along the approach path.

A method for constructing a landing area associated with a pre-determined approach path for landing a vehicle is provided. The method comprises the step of placing a visual navigational aid along or within the landing area, the visual navigational aid comprising a plurality of high intensity LEDs or LED arrays to produce multiple light beams with different colors and/or flash patterns; and a plurality of optical beam shaping apparatus to control the shape of the light beams in a way such that different colored and/or patterned light beams are separated in a layered structure by narrow transition zones, and the color and/or flash pattern variation of the light beams is used for guiding the vehicle along the approach path.

A landing area associated with a pre-determined approach path for landing a vehicle is provided. The landing area comprises at least one visual navigational aid imbedded therein or associated therewith, each of the visual navigational aids comprising a plurality of high intensity LEDs or LED arrays to produce multiple light beams with different colors and/or flash patterns; and a plurality of optical beam shaping apparatus to control the shape of the light beams in a way such that different colored and/or patterned light beams are separated in a layered structure by narrow transition zones, and the color and/or flash pattern variation of the light beams is used for guiding the vehicle along the approach path.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
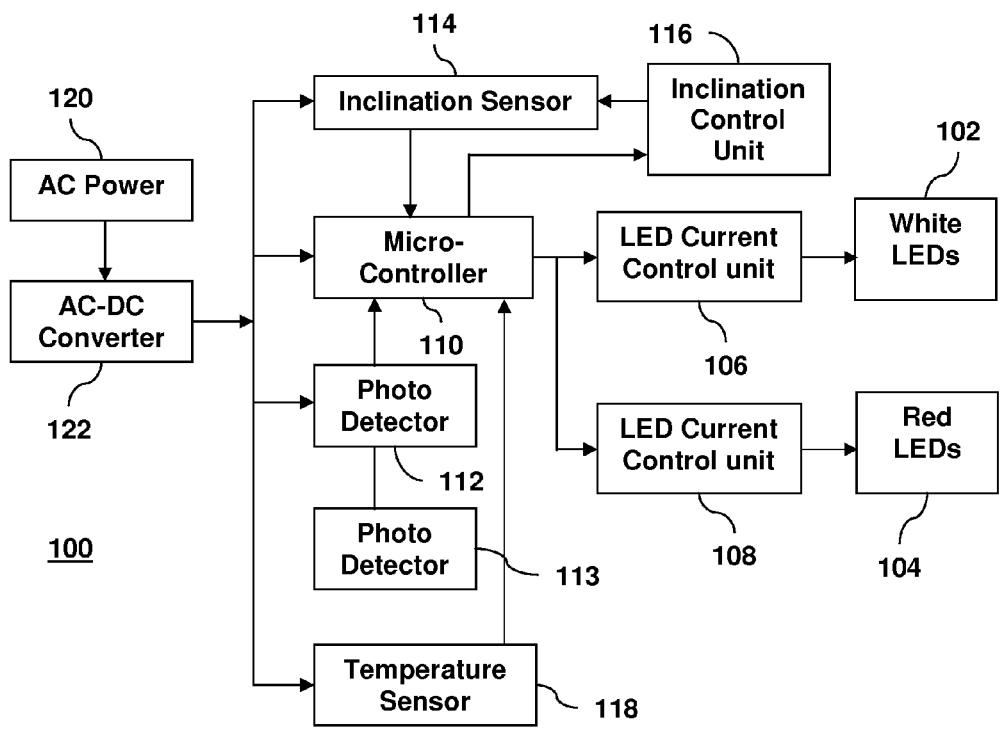
FIG. 1 shows a block diagram of the LED based precision approach path indicator (PAPI).

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to visual navigational aids based on high intensity LEDs. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The block diagram of a preferred embodiment of the present invention is shown in FIG. 1, which illustrates a precision approach path indicator (PAPI) 100 comprising two groups of high intensity LEDs 102 and 104 that produce two different colored light beams, e.g. white and red colored light beams, respectively. Depending on application requirements, the maximum luminous intensity of the LED light beam can reach a level of greater than thirty thousand candelas (>30,000 cd). Such a high luminous intensity is achieved by adopting a chip-on-board (COB) LED technology, where the LED chips are directly surface mounted on a thermal conductive substrate for improved heat dissipation. The COB package allows larger light emitting surface and higher drive current for the LED chip to increase its output power. The COB packaging further leads to long lifetime as well as wavelength and intensity stability. The intensity of the LED lights is adjustable by controlling their drive currents through two LED current control units 106, 108 and a micro-controller 110, which can either receive commands from a front panel or a wireless transceiver (both not shown in the figure).

Multiple sensor elements are integrated into the PAPI apparatus 100 for automatic LED intensity control. Referring to FIG. 1, a photo detector 112 is used to measure ambient light conditions. The acquired information is sent to the micro-controller 110 to switch the PAPI 100 between day mode operation (which corresponds to 90-100% of maximum LED intensity) and night mode operation (which corresponds to 5% or 20% of maximum LED intensity). Another photo detector 113 is utilized to measure the intensity of the LED lights 102 and 104, which provides feed-back control information to the micro-controller 110 to maintain the LED intensity at a constant level regardless of component aging or operation and environmental factors. An inclination sensor 114 is used to measure the elevation angle of the PAPI apparatus 100. The measured data are displayed on the front panel for beam aiming purposes. In the mean time, data are sent to the micro-controller 110 so that the micro-controller 110 can automatically control the elevation angle of the PAPI 100 through an inclination control unit 116. Further, the micro-controller 110 can turn off the LED lights 102, 104 when the measured elevation angle is beyond certain allowable ranges. Also included in the PAPI 100 is a temperature sensor 118, which feeds sensed temperature information to the micro-controller 110 and allows same to adjust the LED drive current according to sensed ambient temperature variations to thereby eliminate the temperature induced LED intensity drift. The disclosed PAPI apparatus 100 can operate with a standard utility alternating-current (AC) power supply 120. An AC-DC converter 122 is embedded in the PAPI apparatus 100 to supply DC (direct current) power to all components of apparatus 100.

Figure 2:
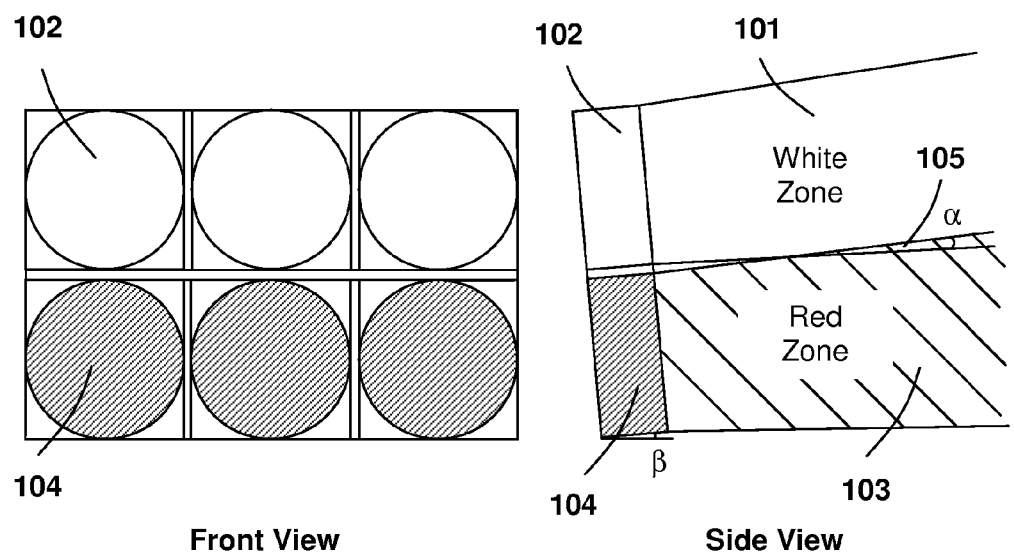
FIG. 2 illustrates the operation mode of the precision approach path indicator.

The operation mode of the PAPI apparatus is illustrated in FIG. 2. The white LEDs 102 produce a white-colored light beam 101 in the top section and the red LEDs 104 produce a red-colored light beam 103 in the bottom section. The shapes of the LED beams are controlled so that the white lighting zone 101 and the red lighting zone 103 are separated by a narrow transition zone 105 in the horizontal plane. The vertical spread angle ($\alpha$) of the transition zone 105 is less than three minutes of arc (<3'). It is noted that the angle $\alpha$ is exaggerated in the figure for illustration purposes. The inclination angle ($\beta$) of the LED module can be adjusted in a range (such as from 2° to 8°) to adapt for different glide slope requirements.

Figure 3:
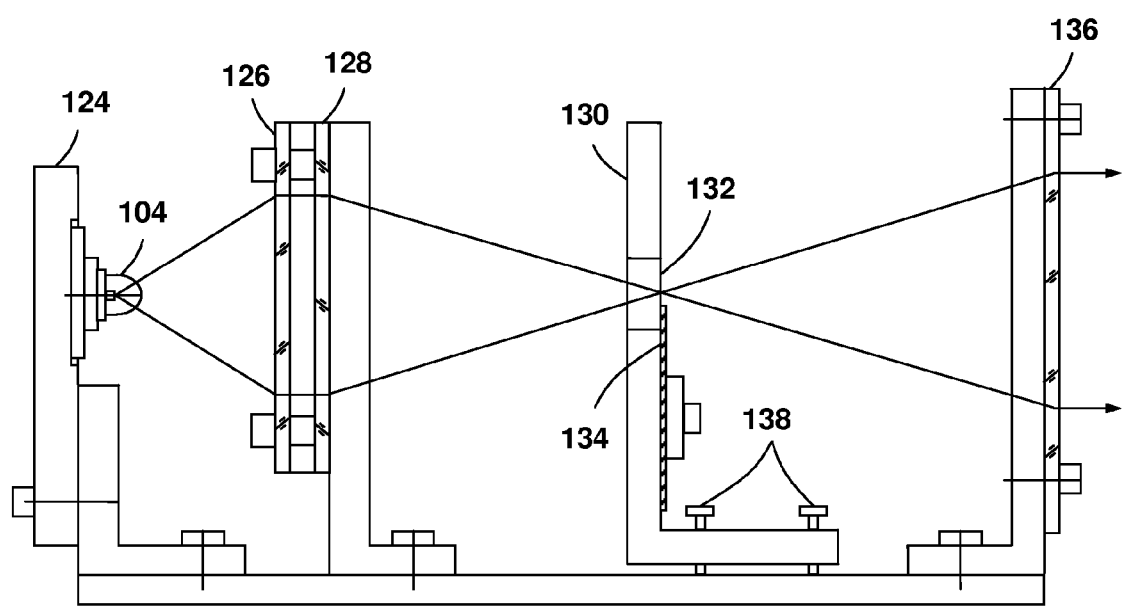
FIG. 3 illustrates the optical system design for the precision approach path indicator.

A detailed illustration of the beam shaping optical system is shown in FIG. 3. A COB packaged red LED 104 is vertically mounted on a heat sink 124. The light emitted from the red LED 104 is collected by a pair of optical lenses 126, 128 and forms an image of the LED on the image plane of the lens pair 126, 128. A beam shaping apparatus 130 is placed on the image plane, which comprises a pupil 132 and a sharp-edged blade 134. The blade 134 blocks the lower portion of the LED image and produces an illumination pattern with a sharp line-shaped edge in the horizontal plane. The tilt angle and vertical position of the beam shaping apparatus 130 can be fine-tuned through two adjustable screws 138. The illumination pattern is located on the focal plane of another optical lens 136, which collimates the LED beam and produces a sharp-edged red LED beam with fixed elevation angle that is set by the inclination of the LED fixture. A sharp-edged white LED beam can be produced in a similar way. In this case, the blade is positioned to block the upper portion of the LED image. By combining the two LED beams along their line-shaped edges, a two-colored LED beam is formed with white light in the top section and red light in the bottom section. The transition zone from white light to red light is kept as narrow as possible by fine-tuning the position of the beam shaping apparatus 130 for individual LEDs. In a slight variation of the present embodiment, the standard optical lens 136 can be replaced by a cylindrical optical lens to further narrow down the width or vertical spread angle of the transition zone.

Figure 4:
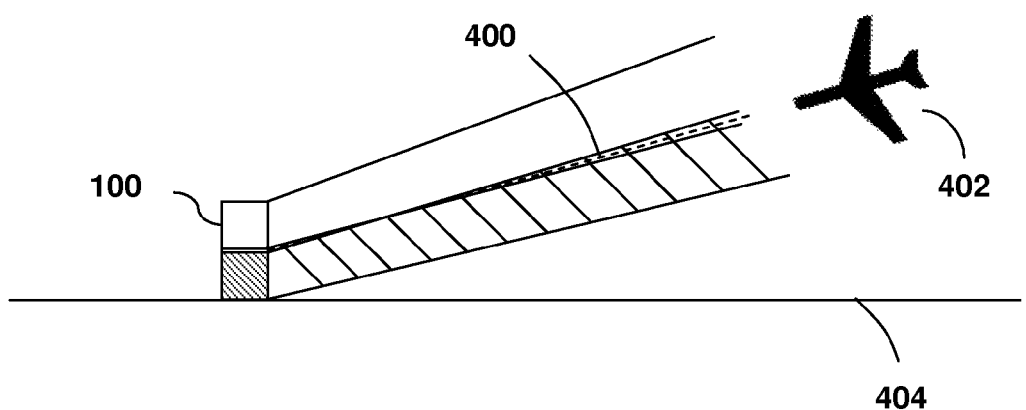
FIG. 4 shows a landing area of a vehicle having a visual navigational aid associated therewith suitable for the present invention.

FIG. 4 shows an approach path 400 for a vehicle such as an aircraft 402 as designated by a PAPI apparatus 100 disclosed in FIG. 1 of the present invention. The vehicle may comprise an aircraft 402, a space ship, etc. A landing area such as part of a runway 404 is disposed to have the PAPI apparatus 100 associated therewith. For example, PAPI apparatus 100 may be mounted on, or in close proximity to, the runway 404. The landing area may comprise physical entities other than the runway 404 such a part of a dock in a sea port, and the like. Any landing area can advantageously benefit from the provisioning of the PAPI apparatus 100.

In another embodiment of the present invention, the visible LEDs are replaced with infrared LEDs to provide navigational aids for pilots wearing night vision goggles. In this embodiment, the LEDs or LED arrays generate two light beams, one of which is modulated in intensity to produce a flash pattern. Utilizing similar optical beam shaping apparatus as disclosed in the first embodiment, the steady LED beam and the flashing LED beam are combined into a multi-patterned light beam with narrow transition zone between different flash patterns. The intensity and flash pattern of the LED beams can be automatically controlled by a micro-controller to adapt for different environmental conditions.

In yet another embodiment of the present invention, a multi-colored (ultra-violet, visible or infrared) and/or multi-flash-patterned LED light is used as a centerline indicator to guide an aircraft to the centerline of an airport runway. In this embodiment, the LED beam is split in the horizontal direction with its narrow transition zone aligned with the centerline of the runway. The pilots of incoming aircrafts can adjust their approach path according to the color or flash pattern which they are adapted to observe.

In the foregoing specification, specific embodiments of the present invention have been described. However, one of ordinary skill in the art appreciates that various modifications and changes can be made without departing from the scope of the present invention as set forth in the claims below. For example, with the advance of semiconductor technology, higher intensity LEDs will be readily available. Thus the number of LEDs used in the PAPI apparatus can be further reduced. Additional colors or flash patterns can be added to the LED beam to provide more accurate approach path indication. The color, flash pattern, and luminous intensity of the LEDs cited in the specific embodiments are illustrative rather than limiting. The LED based approach path indicator can be used for any navigational aid applications that require an alignment function. For example, the LED light can be used as a gate marker for guiding aircrafts approaching a terminal gate, or in loading dock applications. Furthermore, the present invention can be used in maritime applications for the alignment of approaching ships into a shipping channel/harbor/bridge. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A visual navigational aid for guiding a vehicle to a pre-determined approach path, the visual navigational aid comprising:
    a plurality of high intensity LEDs or LED arrays for producing a plurality of light beams with at least one of different colors or flash patterns;

a plurality of beam blocking elements disposed in a path of said plurality of light beams, each beam blocking elements having at least one sharp edge for partially blocking each light beam to produce a plurality of partially blocked light beams; and a plurality of optical lens for collimating said plurality of partially blocked light beams to produce a plurality of substantially collimated light beams separated by narrow transition zones for guiding the vehicle to the pre-determined approach path;

wherein each of the plurality of beam blocking elements is disposed substantially on a focal plane of each of the plurality of optical lens.

2. The visual navigational aid of claim 1, wherein the LEDs or LED arrays produce at least one of ultra-violet, visible, or infrared light beams.

3. The visual navigational aid of claim 1 further comprising a control unit for LED intensity control, and wherein the control unit is capable of receiving commands from both local and remote locations.

4. The visual navigational aid of claim 3 further comprising a plurality of sensor elements.

5. The visual navigational aid of claim 4, wherein the sensor elements comprise at least one of photo detectors, temperature sensors, or inclination sensors.

6. The visual navigational aid of claim 4, wherein information collected by the sensor elements is sent to the control unit for automatic LED intensity regulation.

7. The visual navigational aid of claim 1 further comprising an inclination controller to control the inclination status or position of the visual navigational aid.

8. The visual navigational aid of claim 1, wherein the plurality of high intensity LEDs or LED arrays comprises a set of chip-on-board (COB) LEDs, and wherein the LED chips are directly surface mounted on a thermal conductive substrate.

9. A method for constructing a landing area associated with a pre-determined approach path for landing a vehicle, comprising the step of placing a visual navigational aid along or within the landing area, the visual navigational aid comprising:

a plurality of high intensity LEDs or LED arrays for producing a plurality of light beams with at least one of different colors or flash patterns;

a plurality of beam blocking elements disposed in a path of said plurality of light beams, each beam blocking elements having at least one sharp edge for partially blocking each light beam to produce a plurality of partially blocked light beams; and a plurality of optical lens for collimating said plurality of partially blocked light beams to produce a plurality of substantially collimated light beams separated by narrow transition zones for guiding the vehicle to the pre-determined approach path;

wherein each of the plurality of beam blocking elements is disposed substantially on a focal plane of each of the plurality of optical lens.

10. The method of claim 9, wherein the LEDs or LED arrays produce at least one of ultra-violet, visible, or infrared light beams.

11. The method of claim 9, wherein the visual navigational aid further comprises a control unit for LED intensity control, and wherein the control unit is capable of receiving commands from both local and remote locations.

12. The method of claim 11, wherein the visual navigational aid further comprises a plurality of sensor elements.

13. The method of claim 12, wherein the sensor elements comprise at least one of photo detectors, temperature sensors, or inclination sensors.

14. The method of claim 12, wherein information collected by the sensor elements is sent to the control unit for automatic LED intensity regulation.

15. The method of claim 9, wherein the visual navigational aid further comprises an inclination controller to control the inclination status or position of the visual navigational aid.

16. The method of claim 9, wherein the plurality of high intensity LEDs or LED arrays comprises a set of chip-on-board (COB) LEDs, and wherein the LED chips are directly surface mounted on a thermal conductive substrate.

17. A landing area associated with a pre-determined approach path for landing a vehicle comprising at least one visual navigational aid imbedded therein or associated therewith, each of the visual navigational aids comprising:

a plurality of high intensity LEDs or LED arrays for producing a plurality of light beams with at least one of different colors or flash patterns;

a plurality of beam blocking elements disposed in a path of said plurality of light beams, each beam blocking elements having at least one sharp edge for partially blocking each light beam to produce a plurality of partially blocked light beams; and a plurality of optical lens for collimating said plurality of partially blocked light beams to produce a plurality of substantially collimated light beams separated by narrow transition zones for guiding the vehicle to the pre-determined approach path;

wherein each of the plurality of beam blocking elements is disposed substantially on a focal plane of each of the plurality of optical lens.

18. The landing area of claim 17, wherein the LEDs or LED arrays produce at least one of ultra-violet, visible, or infrared light beams.

19. The landing area of claim 17, wherein each of the visual navigational aids further comprises a control unit for LED intensity control, and wherein the control unit is capable of receiving commands from both local and remote locations.

20. The landing area of claim 19, wherein each of the visual navigational aids further comprises a plurality of sensor elements.

21. The landing area of claim 20, wherein the sensor elements comprise at least one of photo detectors, temperature sensors, or inclination sensors.

22. The landing area of claim 20, wherein information collected by the sensor elements is sent to the control unit for automatic LED intensity regulation.

23. The landing area of claim 17, wherein each of the visual navigational aids further comprises an inclination controller to control the inclination status or position of the visual navigational aid.

24. The landing area of claim 17, wherein the plurality of high intensity LEDs or LED arrays comprises a set of chip-on-board (COB) LEDs, and wherein the LED chips are directly surface mounted on a thermal conductive substrate.

* * * * *